United States Patent Office 2,884,411
Patented Apr. 28, 1959

2,884,411
PREPARATION OF A GLUCOSAMINE

Kurt Fritz Heyns, Hamburg, Germany, assignor to Corn Products Company, a corporation of New Jersey No Drawing. Application July 29, 1954
Serial No. 446,665

5 Claims. (Cl. 260—211)

Various important amino sugars (e.g., glucosamine) belong to the group of alpha-aminoaldehydes, as well as other agents difficultly accessible by present synthetic methods, which are of particular interest because of their easy convertibility into pyrazine derivatives.

Aminoaldehydes can be obtained, but with difficulty and in small quantities, from alpha-aminocarboxylic acid esters by reduction with sodium amalgam (C. Neuberg and E. Fischer, Ber. 41, 956/1908; E. Fischer, Ber. 41, 1019/1908; E. Fischer and T. Kametaka, A. 365, 7/1909), and can also be obtained from aminoaldehydeacetals which in turn are prepared from the appropriate halogen aldehydeacetals by reaction with ammonia and amines (DRP 845, 348; U.S. 2,490,385), whereby, however, it is only possible to split the acetal with difficulty. The great instability of the aminoaldehydes also causes many difficulties in tests. It can also be seen from "Methods of Organic Chemistry" (Houben-Weyl), 4th. edition, vol. VII, part 1, Aldehyde (1954), particularly page 284, that, above all, the processes of preparation and purifying require improvement, as amino sugars have a particular physiological significance.

It has now been found that compounds which contain the structure $CH_2 \cdot OH$—$CO$, alpha-ketols, so react with liquid or aqueous ammonia that apparently aminoaldehyde is formed through reaction at the carbonyl group with subsequent hydrogen elimination from the neighboring C-atom (prototropy):

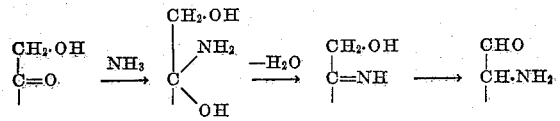

The reaction with amines, whereby N-substituted aminoaldehydes are formed, is similar. During the reaction, the yield is improved by the addition of ammonium salts of inorganic or organic acids (ammonium halides, ammonium acetate) for reasons not exactly known. All ketonic sugars can be used, such as fructose, sorbose, tagatose, sedoheptulose, ribulose, and erythrulose, but dihydroxyacetone, hydroxyacetone, and hydroxyacetophenone can also be converted. The primary reactant containing N is ammonia (or substances yielding ammonia), but primary and secondary amines, such as methylamine, butylamine, benzylamine or diethylamine can be used also.

Surprisingly, alpha-aldols are also to a certain extent rearranged, but it must be assumed that these are first rearranged into the appropriate ketols during the reaction:

as is illustrated by equilibrations in the lower carbohydrate series (see the numerous old papers by Nef in the "Annalen der Chemie," newer editions, regarding rearrangement of arabinose to ribulose; see Y. Matsuschima and Y. Imanaga, Nature 171 (1953), No. 4350, p. 475).

The type of reaction being considered is clearly differentiated from rearrangements like the Amadori, in which substituted 1-amino-2-keto compounds can be produced from aldoses, primarily through aromatic amines (such as aniline), without, however, the corresponding rearrangement with ammonia being possible, as aldose with ammonia at best gives unstable aldehydeammonialike compounds without subsequent intramolecular dehydrogenation of the secondary alcohol group adjacent to the aldehyde group (see also Ber. 86, 1453 (1953)).

The following examples which are intended as typical and informative only and not in a limiting sense, will further illustrate the process of the invention.

Example 1

Eighteen grams fructose are dissolved in 300 ccm. liquid ammonia (prepared from ammonia gas dried over sodium hydroxide), moisture being excluded. The mixture is put into a pre-cooled autoclave and heated to 100° C. for 6 hours. The ammonia is evaporated (in order to use it for further conversions if necessary, after being dried again) and a colorless to pale yellow syrup results, from which the remaining ammonia is pumped off as far as possible in vacuum. What remains is dissolved in about 500 ccm. water containing hydrochloric acid and further HCl is immediately added if the solution is not yet slightly acid. The solution is then added to a column of 200 g. of an acid cation exchanger, e.g., Lewatit S–100, and afterwards washed with water until hardly any reducing substance passes through. The filtrate contains 10–12 g. of unreacted fructose which can be recovered for further conversions. The resultant glucosamine is eluted from the exchanger column with diluted hydrochloric acid as the hydrochloride, to which ammonium chloride is added. After evaporation under reduced pressure and a recrystallization from hydrochloric acid, water and methanol, 4–5 g. glucosamine hydrochloride are obtained and show the same constants as a product produced from marine chitin by hydrolysis.

Example 2

Eighteen grams fructose are dissolved in 500 ccm. liquid ammonia with 5.3 g. ammonium chloride or the equivalent amount of ammonium acetate, and heated in the autoclave for 6 hours at 100° C. The ammonia having for the most part been removed after conversion is concluded, a solution is made with 250 ccm. water, neutralized and then, without any further preliminary treatment, 42 g. sodium bicarbonate are added, and 55 g. of carbobenzoxychloride in small portions, while shaking. The conjugated product begins to precipitate after 1½ hours and after standing in the refrigerator it is filtrated. It is then shaken with 600 ccm. chloroform and washed to remove the carbamic acid benzyl esters which have been formed from the ammonium chloride. 2.3 grams of a substance melting at 216° C. was obtained. Upon boiling with 2 N HCl, this product gradually went into solution and the paper chromatograms show an $R_F$ characteristic for glucosamine. This compound is believed to be the dicarbobenzoxy derivative of glucosaminyl amine $C_{22}H_{26}N_2O_8$ (446.4). Calculated: C, 59.18; H, 5.87; N, 6.28. Found: C, 59.12; H, 6.10; N, 6.05. Molecular weight determined according to Rast was 452. $(\alpha)_D^{20} = +2°$ (in pyridine, conc.=5.07). A second product was obtained by concentrating the mother liquor. This product was purified by recrystallization from a 30 percent methanol-water mixture. The yield was 6 g. The product was identified as N-carbobenzoxyd-glucosamine. Mixed melting point with the identical known derivative from d-glucosamine was not depressed.

$C_{14}H_{19}O_7N$, molecular weight—313.3. Calculated: C, 53.66; H, 6.12; N, 4.47. Found: C, 53.55; H, 6.22; N, 4.51. $(\alpha)_D^{20}$ starting +62.8°, rotation after 24 hours +75.4°.

N-carbobenzoxy-d-glucosamine was hydrogenated to glucosamine as follows:

0.3651 gram of N-carbobenzoxy-d-glucosamine was hydrogenated in the presence of 0.3679 g. of palladium on carbon catalyst (10 percent Pd) in 25 ml. of 2 N HCl at 40° C. for 6½ hours. After filtration and concentration of the solution 113 mg. of pure glucosamine hydrochloride was obtained. The determination according to Elson and Morgan (Biochem. J. 27, 1824 (1933)), gave 0.2472 mg. of glucosamine hydrochloride corresponding to 98 percent yield. $C_6H_{13}O_5N \cdot HCl$ (215.6). Calculated: C, 33.42; H, 6.54; N, 6.50. Found: C, 33.35; H, 6.65; N, 6.55. $(\alpha)_D^{20}=89.4°$; after 18 hours 70.9°.

Example 3

Eighteen grams fructose are dissolved in 500 ccm. concentrated aqueous ammonia and the mixture heated to boiling for 2 hours, during which a large part of the ammonia evaporates. The solution takes on a dark color and immediately after conversion is evaporated dry under reduced pressure, and acidified as quickly as possible with HCl, as the free glucosamine is very unstable. Further processing is as described under Example 1. A solution is eluted from the exchanger which gives 8 g. of dark colored crystalline substance after the solvent has been removed, this being impure glucosamine hydrochloride. Purifying is done by the phenyl isocyanate derivative according to H. Steudel, Hoppe-Seyler's Z. physiol. Chem. 34, 370 (1901/1902).

The derivative, 1-phenyl-4-(d-arabo-tetrahydroxybutyl)-imidazolone-2, melted at 210° C.; mixed melting point of the cyclized phenyl isocyanate derivative prepared from d-glucosamine obtained from shrimp shells was 208° C. $C_{13}H_{16}O_5N_2$ (M.W., 256.3). Calculated: C, 55.68; N, 5.76; N, 10. Found: C, 5542; H, 5.70; N, 10.13 $(\alpha)_D^{20}$ +86.8°.

Example 4

Nine grams fructose are treated with 200 ccm. of n-butylamine for 6 hours at 80° C. in an autoclave and the superfluous amine afterwards distilled off under reduced pressure. The residue remaining is dissolved in 500 ccm. acidified water and put through ion exchanger columns in order to separate the sugar which had not been converted. After eluting it is carefully evaporated to dryness and recrystallized from methanol-water, methanol and methanol-benzene. 2.8–3.0 g. N-butylglucosamine are produced, identified by C, H, N-analysis.

Example 5

Nine grams fructose are treated with 200 ccm. benzylamine as in Example 4, and processed. No free N-benzylglucosamine is produced, but rather an aldehyde-ammonia-type product of benzylamine and N-benzylglucosamine, identified by C, H, N-analysis.

Example 6

Eighteen grams sorbose are treated with 500 ccm. liquid ammonia in the presence of 5.3 g. ammonium chloride, and processed, as in Example 2. Two isomeric aminoaldehydes are produced, namely, gulosamine, and small amounts of idosamine, as paper partition chromatography showed. The mixture of amino sugar (8 g.) is purified with aqueous methanol, and a gulosaminehydrochloride results which is contaminated by only a few percent of ammoniumchloride. The product has the same $R_F$ value as a product resulting from cyanhydrin synthesis from xylose to gulosamine acid.

Example 7

Nine grams arabinose are treated with pyridine in the usual manner, in order to form ribulose. After drying, the residue is treated with 200 ccm. ammonia, as in Example 1, and processed. Two grams arabinosamine-hydrochloride are produced, M.P. 259° C. (decomposition).

Example 8

Eighteen grams glucose are treated with aqueous or liquid ammonia in the same way as described in the fructose examples. Considerably less glucosamine is formed (15–18%), the isolation of which as hydrochloride, however, can be achieved after the neutral sugar has been removed in exchanger columns. From 4 g. crystallized substance, rendered impure by ammonium salts, 1.8–2.0 g. pure glucosaminehydrochloride can be obtained.

Example 9

Two grams dihydroxyacetone are converted with 500 ccm. liquid ammonia and after standing for 4 hours the ammonia is evaporated off. When the precipitate, mixed with acidified water, is separated in an exchanger column, almost 1.0 g. dihydroxyacetone is obtained. A solution can be isolated out of the column in which 0.6 g. serine-aldehyde are present in addition to ammonium salts. The isolation of the pure aldehyde is difficult. After evaporation it can be treated with 4 ccm. of 30 percent hydrogen peroxide. After standing for 5 hours, oxidation to serine is concluded, which is identifiable through the $R_F$ value and as benzoyl compound.

Example 10

Two grams hydroxyacetone (from bromacetone by saponification with potassium formate in the presence of methanol, according to Levene and Walti, Organic Syntheses II, 5) were treated as in Example 9. A solution of 0.5 g. alaninealdehyde (proved by oxidation to alanine) is obtained.

I claim:

1. A process for preparing a glucosamine in the form of a glucosamine hydrochloride which comprises mixing fructose and a nitrogen compound selected from the group consisting of liquid ammonia, concentrated aqueous ammonia, methyl amine, butyl amine, benzylamine and diethylamine, autogenously heating said mixture at at least reflux temperature to convert said fructose to a glucosamine, adding hydrochloric acid to said heated mixture to stabilize said glucosamine as the hydrochloride thereof, treating said acidified heated mixture with an acid cation exchanger, and recovering the glucosamine as the hydrochloride thereof from said acid cation exchanger.

2. The process of claim 1 wherein said mixture is autogenously heated at 100° C.

3. The process of claim 1 wherein said mixture also contains an ammonium salt.

4. A process for preparing glucosamine in the form of glucosamine hydrochloride which comprises mixing fructose and ammonia, autogenously heating said mixture at 100° C. to convert said fructose to glucosamine, adding hydrochloric acid to said heated mixture to stabilize glucosamine as glucosamine hydrochloride, treating said acidified heated mixture with an acid cation exchanger, washing said exchanger with hydrochloric acid and recovering said glucosamine hydrochloride.

5. The process of claim 4 wherein said mixture also contains an ammonium salt.

References Cited in the file of this patent

UNITED STATES PATENTS

| Number | Name | Date |
|---|---|---|
| 1,031,602 | Wechsler | July 2, 1912 |
| 2,197,540 | Klug | Apr. 16, 1940 |
| 2,235,938 | Lorand | Mar. 25, 1941 |
| 2,386,926 | Block | Oct. 16, 1945 |
| 2,387,824 | Block | Oct. 30, 1945 |